TRANSISTOR POWER SYSTEMS

Filed Feb. 1, 1957

INVENTOR.
Donald D. Grieg
BY Albert Sperry
ATTORNEY

June 27, 1961 D. D. GRIEG 2,990,517

TRANSISTOR POWER SYSTEMS

Filed Feb. 1, 1957 2 Sheets-Sheet 2

INVENTOR.
Donald D. Grieg
BY
Albert Sperry
ATTORNEY 2,990,517
TRANSISTOR POWER SYSTEMS

Donald D. Grieg, North Caldwell, N.J., assignor to Electronic Research Associates, Inc., Nutley, N.J., a corporation of New Jersey

Filed Feb. 1, 1957, Ser. No. 637,832
5 Claims. (Cl. 331—52)

This invention relates to power systems such as converters and inverters wherein transistors are used as switching elements. The invention is directed particularly to systems whereby a high power output may be obtained.

Converters employed for transforming low voltage D.C. into high voltage D.C., and inverters for transforming low voltage D.C. into A.C. of either high or low voltage, have many applications in industry. The equipment heretofore employed for such purposes has generally utilized vibrators for interrupting the D.C. to transform it into a pulsating signal for further treatment, or has employed rotary elements including a D.C. motor and coupled generator.

While the use of transistors as switching elements in such systems is known to eliminate many of the limitations and drawbacks of mechanically controlled equipment, the power capabilities of currently available transistors are limited and the power output obtainable with prior systems has been relatively low.

Attempts to increase the power output of transistor systems by employing a number of transistor units arranged in parallel have not proven very satisfactory since it is extremely difficult to distribute the current equally between parallel units. The circuits therefore tend to become unbalanced with the result that some units exceed their ratings or power capacity and function improperly or may burn out, whereas other units may operate at ratings well below their peak capacity. Moreover, whenever it is necessary to replace any one or more units in the system, the selection of a properly balanced unit is difficult and imbalance and damage may result to other previously satisfactory units of the system.

In accordance with the present invention these limitations and objections to transistor types of converters and inverters are overcome and systems are provided whereby a high power output is obtainable while balancing of the various units of the system is unnecessary.

These advantages are preferably attained by providing a series of units which are coordinated in their operation and each of which serves to feed amplified current in series to a load circuit so as to attain a total output current which is the algebraic sum of the amplified output of the individual units in the system. In this way the desired power output may be attained, whereas balancing of the individual units is not required and no unit will be overloaded. Moreover, when cooling of the transistors is required, the operation is simplified since each unit may be cooled individually and no concentrated heating effect is encountered.

The principal object of the present invention is to provide power systems embodying transistors which are capable of providing a high power output.

Another object of the invention is to eliminate the need for balancing the units employed in transistor type converters and inverters.

A further object of the invention is to provide a power system embodying a plurality of transistor circuits in the form of units which serve to add their power outputs in series whereby the total power output will equal the algebraic sum of the outputs of the individual units.

These and other objects and features of the present invention will appear from the following description thereof wherein reference is made to the drawing for the purpose of illustrating typical and preferred power systems embodying the present invention but without intending to limit the scope of the invention thereby.

Figure 1:
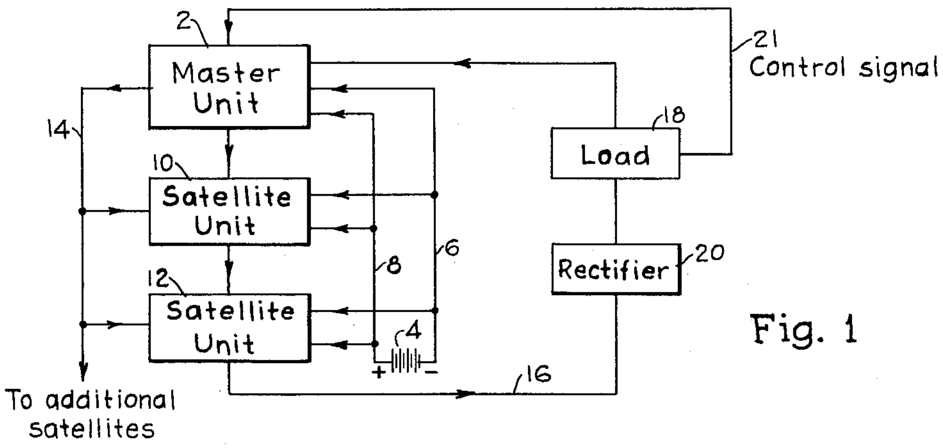
FIG. 1 is a block diagram illustrating the general nature and relation of various units in a typical system embodying the present invention.

The system indicated generally in FIG. 1 embodies a master or control unit 2 embodying one or more transistors supplied with direct current from a suitable source 4 through the conductors 6 and 8. The master unit includes elements for feeding a portion of the output back to the input so as to cause the system to function as an oscillator for converting the applied D.C. into an amplified A.C. signal. A part of the feed-back also is supplied to one or more successive units or satellites, indicated at 10 and 12, through a conductor 14 to control and synchronize the operation of the satellite units. The satellite units 10 and 12, and any additional satellite units connected into the system, may be the same or similar to the master unit 2. In any event, the excess of the A.C. output from the master unit 2, which is not required for feed-back, and the total output current from the satellite units, units 10, 12, etc., is supplied in series to a load circuit 16 containing a load 18. If the system is to be employed as a converter for developing high voltage D.C. the load circuit 16 may include a rectifier 20. However, if A.C. is desired, the rectifier 20 may, of course, be omitted and the system will function as an inverter. Further, if desired, the system may be controlled as described in copending application Serial No. 644,240, filed March 6, 1957, now Patent No. 2,959,745, as represented by the connection 21.

The system provided enables each unit to function independently of any other unit employed insofar as its voltage and current output are concerned. However, the phase and polarity of the current supplied to the satellite units from the master unit and from the D.C. source are the same and serve to coordinate the operation of all the satellites whereby all units will feed amplified A.C. to the load circuit 16 in phase and in an additive manner to increase the total current output from the assembly. The limited functioning or even the total failure of any satellite unit will not affect the functioning or operation of any other unit. As a result it is possible to substitute one unit for another or to introduce as many units into the system as may be desired for any particular operation without critical adjustment or balancing of the units with respect to each other.

Figure 2:
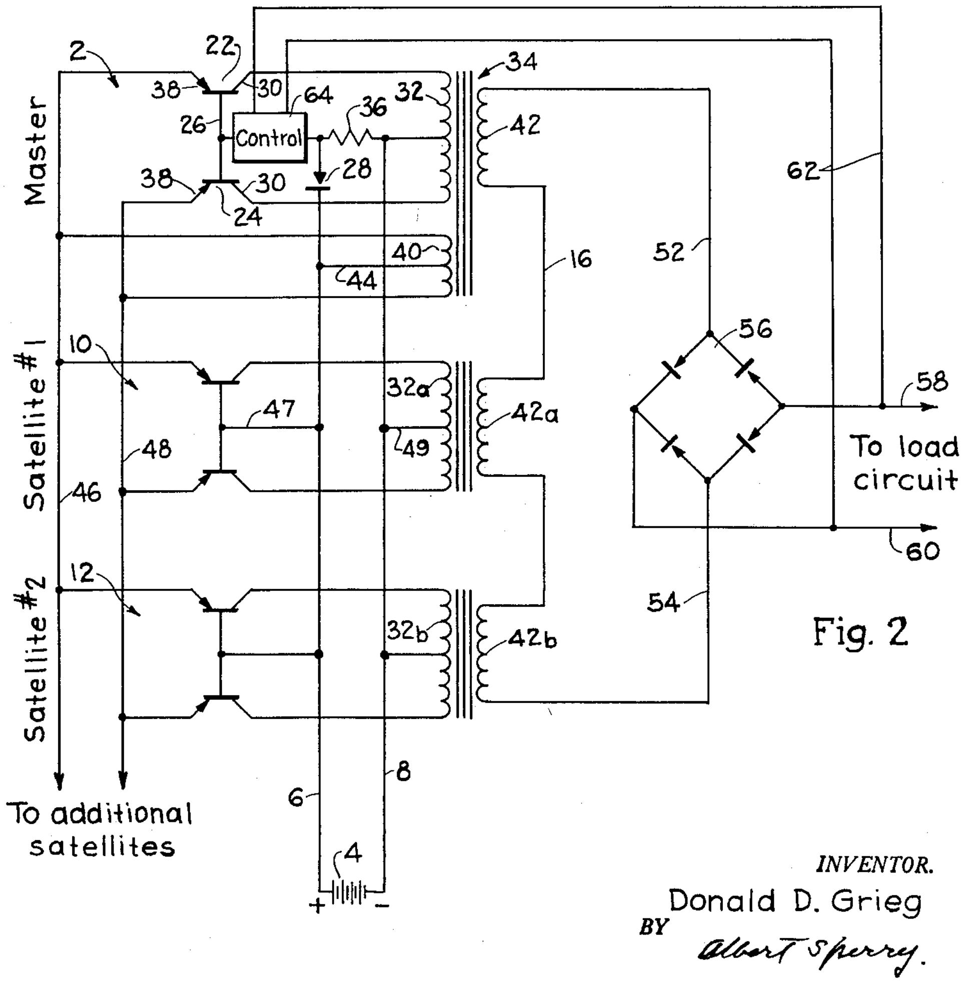
FIG. 2 is a wiring diagram illustrating a preferred form of unit and assembly which may be employed in the system of FIG. 1.

A typical and preferred type of master unit and satellite and its interconnections is illustrated in FIG. 2 wherein the master unit 2 embodies the transistors 22 and 24 arranged for oscillation in a push-pull relation, although it will, of course, be evident that the transistor oscillator may embody an open ended unit. The base 26 of each transistor is connected to the emitter of a diode 28 in the positive line 6 from the D.C. source 4. The collectors 30 of the transistors are connected to the opposite ends of the primary winding 32 of a transformer 34 and the negative line 8 from the D.C. source is connected to the mid-point of the primary winding 32. A resistance 36 is connected across the lines 6 and 8 to establish the desider positive bias for the base 26 of each transistor and the desired negative bias for the collectors 30 thereof. The emitters 38 of the transistors 22 and 24 are coupled to the collectors through a feed-back or control winding 40 receiving current from the secondary winding 42 of the transformer 34. The desired bias for the emitters is established by a connection 44 extending from the mid-point of feed-back winding 40 to the positive line 6 from the D.C. source 4.

The arrangement thus provided serves to initiate oscillations in the system as soon as the D.C. from source 4 is turned on. This will result from the fact that a positive potential is applied to the base of each of the transistors 22 and 24 and a negative potential is applied to the collectors thereof. However the opposite halves of the control winding 40 impose opposite polarity on the emitters of the transistors 22 and 24 whereby the transistors develop amplified current outputs which are similar in amplitude but opposite in phase. The transistors are thus driven alternately from the cut-off condition, where no current flows from the battery, to the on condition wherein the full battery current flows through the transistors to the primary winding 32. The amplified output currents from the transistors 22 and 24 are thus applied successively to the primary and load circuits to develop a complete oscillation or A.C. The current thus applied to the primary winding 32 of transformer 34 develops a current of the desired amplitude and frequency in the secondary winding 42 of the transformer and a portion of the latter current is fed back through control winding 40 to the emitters of the transistors. The feed-back current supplied to the emitters by the winding 40 is in phase with the output current from the collectors and of course only a small portion of the output current need be supplied to the emitters—the remainder being supplied to the load circuit 16.

The oscillations, once initiated, will therefore continue as long as the D.C. is applied whereby the D.C. impressed on the system by the source 4 through lines 6 and 8 will be converted to A.C. impressed on the load circuit 16.

The satellite units 10, 12, etc. are essentially similar in design to the master unit 2 described. However, the emitters for all or a plurality of the satellite units are supplied with current from the feed-back winding 40 of the master unit 2 through the lines 46 and 48. The necessary bias for the bases and collectors of the transistors in the satellite units are established by connections 47 and 49 leading from the positive and negative sides 6 and 8 of the D.C. line.

Each satellite unit includes a primary winding 32*a*, 32*b*, etc. coupled with a secondary winding 42*a*, 42*b*, etc. The latter windings are connected in series with the secondary winding 42 of the master unit 2 as a part of the load circuit 16. The total output of the individual satellite units 10, 12, etc. and the excess of the output of the master unit 2, not utilized by the feed-back or control circuit, are thus supplied in series to the load circuit 16 for utilization. The phase of the output current of each unit is the same since all of the units are controlled from the same source, namely the feed-back winding 40 of the output of master unit 2. The total current supplied to the load circuit therefore is the algebraic sum of the amplified output currents of all of the units and may be as large as required for any desired use within the limits of the circuitry and elements employed and the power limitations of the master unit. The contribution to the total power developed which is made by any individual unit is wholly independent of the contribution made by any other unit in the system and as a result, the need for effecting a balance between the various units is thereby eliminated.

The nature of the load circuit and its elements is not material since the power supplied may be utilized in any manner desired. Thus if the system is employed as an inverter A.C. power may be taken directly from the lines 52 and 54 supplied by the secondary windings of the load circuit. However, if the system is to be employed as a converter, the lines 52 and 54 may be connected to the opposite junctions of a rectifier network 56 for supplying D.C. of the desired voltage to the output lines 58 and 60 of the rectifier network.

Further as shown and described in the copending application referred to above, rectified current from the lines 58 and 60 may be fed back to the master unit 2 in a return circuit 62 including a control unit 64 which serves to compensate for variations in the characteristics of the output current in the load line 16. However, the control signal or feed-back from the output of master unit 2 to the satellites 10, 12, etc. may be adjusted in any other suitable way desired to effect simultaneous adjustments in the amplitude, frequency and current outputs of the master and satellite units as desired.

Figure 3:
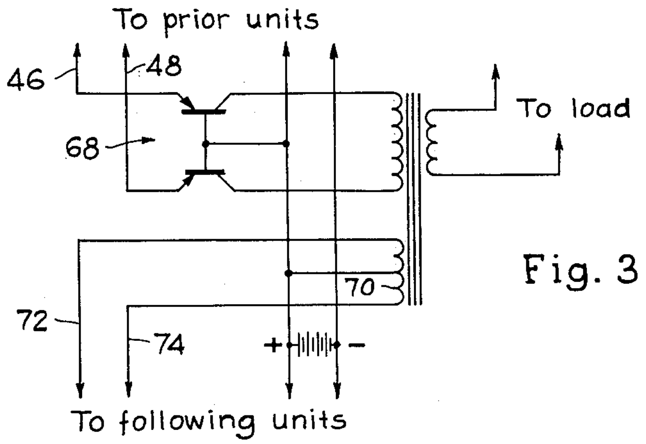
FIG. 3 illustrates a modification of the wiring diagram shown in FIG. 1.

In order to prevent overloading of the master unit 2, the system may be varied as shown in FIG. 3 wherein the satellite unit 68 may correspond to any one of the units 10, 12, etc. in the series of FIG. 2. The unit 68 is utilized as a second master unit in that it is provided with a feed-back or control winding 70. The latter control winding serves to provide the desired feed-back and bias for the emitters of additional units connected to the lines 72 and 74 as in the previously described arrangement.

Figure 4:
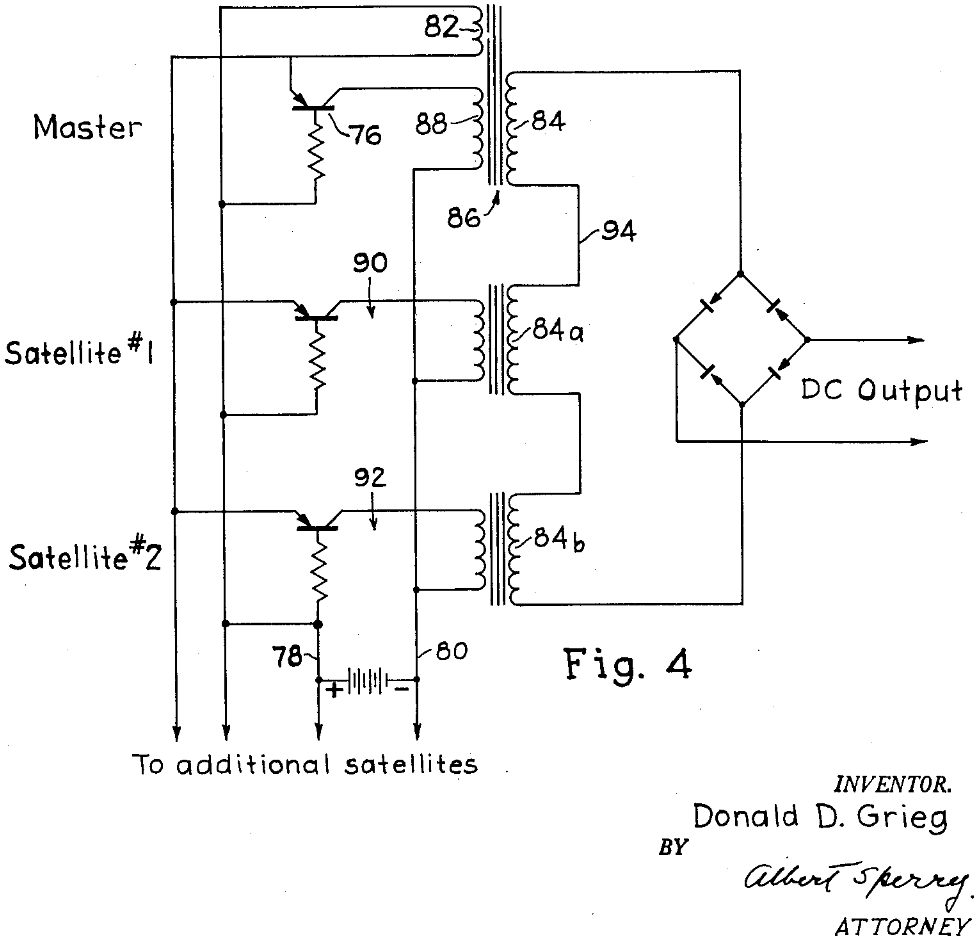
FIG. 4 is a wiring diagram illustrating a further modification of the system represented in FIG. 1.

The systems of the present invention are not limited to the use of units wherein the transistors are arranged in push-pull relation. Thus as shown in FIG. 4, the master unit or any or all of the satellite units may embody a single ended arrangement including a transistor and a transformer primary. The transistor 76 is supplied with D.C. from lines 78 and 80 of the desired polarity for establishing the desired bias for the base and collector. The emitter is biased by the feed-back current from a control winding 82 coupled to the secondary winding 84 of the transformer 86 to which the output current from the collector of the transistor 76 is supplied by the primary winding 88. The control winding 82 serves to provide similar bias for the base and emitter of the satellite units 90, 92, etc. so as to synchronize the operation thereof. The secondary winding 84 of the transformer 86 and the secondary windings 84*a*, 84*b* of the transformer in satellite units 90, 92, etc. are connected to the load circuit 94 in series with the secondary windings of other units in the system so that the total output current developed is the algebraic sum of the amplified currents developed by all of the units in the system.

The invention obviously is also capable of many other modifications and applications and the type of transistors employed can be selected as desired for any particular use required. It will therefore be apparent that numerous other changes and modifications may be made in the arrangement and utilization of the system and of the elements therein without departing from the principle and scope of the invention.

I claim:

1. In combination; a master oscillator circuit; at least a first slave oscillator circuit and coupling means for coupling the outputs of said master oscillator and said first slave oscillator to a common load; said master oscillator circuit having input circuit means for receiving a D.-C. input and output A.-C. circuit means having an A.-C. voltage generated thereon, and feed-back means connected in controlling relation with respect to said master oscillator circuit and driven from the A.-C. output of said master oscillator circuit; said slave oscillator circuit having input circuit means for receiving a D.-C. input and output circuit means having an A.-C. voltage generated thereon; a common D.-C. source connected to said input circuit means of each master oscillator circuit and said slave oscillator circuit; said feed-back means driven by the A.-C. output of said master oscillator circuit being further connected in controlling relation with respect to said slave oscillator circuit to balance the operation of said slave oscillator and said master oscillator circuit.

2. The device of claim 1 wherein said feed-back means causes a balance between the power of said master oscillator circuit and said first slave oscillator circuit.

3. The device of claim 2 which includes a plurality of slave oscillator circuits identical to said first slave oscillator circuit and having said feed-back means of said master oscillator circuit connected in controlling relation therewith.

4. The device substantially as set forth in claim 2 wherein each of said master oscillator circuit and said first slave oscillator circuit are comprised of push-pull transistor oscillators.

5. The device of claim 1 wherein said master oscillator circuit and said first slave oscillator circuit include transistor circuit means.

References Cited in the file of this patent

UNITED STATES PATENTS

| | | |
|---|---|---|
| 1,658,162 | Franklin | Feb. 7, 1928 |
| 2,547,162 | Kidd | Apr. 3, 1951 |
| 2,555,038 | Jones | May 29, 1951 |
| 2,748,274 | Pearlman | May 29, 1956 |
| 2,774,878 | Jensen | Dec. 18, 1956 |
| 2,837,651 | Schultz | June 3, 1958 |
| 2,842,667 | Dench et al. | July 8, 1958 |
| 2,875,397 | Parks | Feb. 24, 1959 |